(12) United States Patent  
Park

(10) Patent No.: US 9,405,252 B2  
(45) Date of Patent: Aug. 2, 2016

(54) IMAGE FORMING APPARATUS THAT CHANGES TO AN IMAGE-FORMATION READY MODE FROM A POWER-SAVE MODE BASED ON A FREQUENCY OF USE OF THE IMAGE FORMING APPARATUS BY AN EXTERNAL DEVICE

(75) Inventor: Sung-joon Park, Hwaseong-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 237 days.

(21) Appl. No.: 13/162,880

(22) Filed: Jun. 17, 2011

(65) Prior Publication Data

US 2012/0133971 A1     May 31, 2012

(30) Foreign Application Priority Data

Nov. 25, 2010    (KR) .................. 10-2010-0118142

(51) Int. Cl.
*G03G 15/00*       (2006.01)
*G06F 3/12*        (2006.01)
(Continued)

(52) U.S. Cl.
CPC ........ *G03G 15/5004* (2013.01); *G03G 15/5075* (2013.01); *G03G 15/5087* (2013.01); *G03G 21/1657* (2013.01); *G06F 3/1213* (2013.01); *G06F 3/1221* (2013.01); *G06F 3/1229* (2013.01); *G06F 3/1292* (2013.01); *H04N 1/00127* (2013.01); *H04N 1/00896* (2013.01); G03G 15/5091 (2013.01); G03G 2215/00109 (2013.01); *G06F 3/1236* (2013.01); *G06F 3/1273* (2013.01); *H04N 1/00307* (2013.01); *H04N 2201/0036* (2013.01);
(Continued)

(58) Field of Classification Search
CPC ............ G03G 15/5004; G06F 3/1221; H04N 1/00896
USPC ....................................................... 358/1.15
See application file for complete search history.

(56) References Cited

U.S. PATENT DOCUMENTS 7,839,514 B2 *  11/2010  Tsuchie et al. ............... 358/1.14
8,284,421 B2 *  10/2012  Lee .............................. 358/1.15
(Continued)

FOREIGN PATENT DOCUMENTS

JP    2002-351647 A   * 12/2002
JP    2005-161655        6/2005
JP    2010-135993        6/2010

OTHER PUBLICATIONS

English language machine translation of JP 2002-351647 A to Suzuki.*

(Continued)

*Primary Examiner* — Eric A Rust
(74) *Attorney, Agent, or Firm* — Staas & Halsey LLP

(57) ABSTRACT

An image forming apparatus is provided. The apparatus includes an image forming unit which performs an image forming job, a communication unit which forms a wireless network according to a predetermined wireless communication standard, a control unit which, if at least one terminal device is connected to the communication unit through the wireless network, determines whether it is required to perform warming-up of the image forming apparatus and performs warming-up of the image forming apparatus, and a storage unit which stores information regarding a connection status of the terminal device. Accordingly, stand-by time for performing an image forming job may be reduced.

5 Claims, 9 Drawing Sheets

(51) Int. Cl.
*H04N 1/00* (2006.01)
*G03G 21/16* (2006.01)

(52) U.S. Cl.
CPC ............ *H04N 2201/0039* (2013.01); *H04N 2201/0055* (2013.01); *H04N 2201/0082* (2013.01); *Y02B 60/1271* (2013.01)

(56) References Cited

U.S. PATENT DOCUMENTS

| | | | |
|---|---|---|---|
| 2003/0025935 A1* | 2/2003 | Somei | 358/1.15 |
| 2009/0109897 A1* | 4/2009 | Woo | 370/328 |
| 2010/0066765 A1* | 3/2010 | Lee | 345/690 |
| 2010/0120406 A1* | 5/2010 | Banga et al. | 455/418 |
| 2010/0128301 A1* | 5/2010 | Bisset | 358/1.15 |
| 2010/0165879 A1* | 7/2010 | Gupta et al. | 370/254 |
| 2011/0225329 A1* | 9/2011 | Charna et al. | 710/62 |
| 2011/0317217 A1* | 12/2011 | Taniuchi | H04N 1/00344 358/1.15 |
| 2012/0019864 A1* | 1/2012 | Mickeleit et al. | 358/1.15 |
| 2012/0158839 A1* | 6/2012 | Hassan et al. | 709/204 |
| 2012/0203962 A1* | 8/2012 | Mochizuki | 711/106 |

OTHER PUBLICATIONS

English language Abstract of JP 2002-351647 A to Suzuki.*
Wi-Fi Alliance, Wi-Fi Alliance Technical Committee P2P Task Group, "Wi-Fi Peer-to-Peer (P2P) Technical Specification, Version 1.1" (2010), pp. 1-159.*
Wi-Fi Peer-to-Peer (P2P) Technical Specification v1.2, retrieved from http://www.scribd.com/doc/215283500/WiFi-P2P-Technical-Specification-v1-2#scribd on Aug. 17, 2015.*

* cited by examiner

IMAGE FORMING APPARATUS THAT CHANGES TO AN IMAGE-FORMATION READY MODE FROM A POWER-SAVE MODE BASED ON A FREQUENCY OF USE OF THE IMAGE FORMING APPARATUS BY AN EXTERNAL DEVICE

CROSS-REFERENCE TO RELATED APPLICATIONS

This application claims priority from Korean Patent Application No. 2010-0118142, filed in the Korean Intellectual Property Office on Nov. 25, 2010, the disclosure of which is incorporated herein by reference.

BACKGROUND OF THE INVENTION

1. Field of the Invention

Aspects of the exemplary embodiments relate to an image forming apparatus and an operating method thereof, and more particularly, to an image forming apparatus which is connected by forming a wireless network with at least one terminal device and an operating method thereof.

2. Description of the Related Art

With development of electronic technologies, various types of electronic apparatuses have been developed and distributed. One of those electronic apparatuses is an image forming apparatus. Generally, an image forming apparatus means an apparatus that forms an image on various recoding media such as a paper. Specifically, examples of such an image forming apparatus include a copy machine, a printer, a scanner, a Multi-Function Peripheral (MFP), and a facsimile.

Such an image forming apparatus is regarded as essential equipment in an office environment. Recently, a network image forming apparatus which is connected through a network to allow users in an office environment to share data directly has been distributed and used.

Meanwhile, distribution of high-end terminal devices such as a smart phone has also been accelerated. Accordingly, various communication standards for simplifying exchange or use of data by forming a network between terminal devices or between different apparatuses have been continuously discussed. One of those communication standards is a Wi-Fi direct communication standard.

Wi-Fi direct is a technology for realizing peer-to-peer transmission between Wi-Fi terminals so that users may communicate directly with each other without internet connection or a wireless access point and Wi-Fi direct is newly defined, recently, to reinforce a wireless peer-to-peer communication method. Wi-Fi direct is also referred to as Wi-Fi P2P and advantageous in that it is provided in the form of infrastructure rather than an ad-hoc technology to strengthen security more than ad-hoc technology, support direct communication between terminal devices, and make it easier to provide internet service.

Such a wireless network technology as Wi-Fi direct may be applicable to an image forming apparatus. That is, a user may connect to an image forming apparatus using a terminal device that he or she carries and perform printing of data stored in the terminal device through the image forming apparatus.

However, an image forming apparatus is usually in an idle state, which means, an image forming job may not be performed immediately and thus, warming-up should be performed or an idle state should be changed to a normal stand-by state prior to performing printing. Therefore, an image forming job is delayed until change of state is completed, and a user has no choice but to just wait during the transition process.

Accordingly, a method for improving user convenience in this regard is required.

SUMMARY OF THE INVENTION

An aspect of the exemplary embodiments relates to an image forming apparatus which is capable of changing its preparation status automatically when there is a possibility that the image forming apparatus would be used, as a terminal device is connected to the image forming apparatus through a wireless network, and an operating method thereof.

Additional aspects and advantages of the present general inventive concept will be set forth in part in the description which follows and, in part, will be obvious from the description, or may be learned by practice of the general inventive concept.

An image forming apparatus, according to an exemplary embodiment, includes an image forming unit which performs an image forming job, a communication unit which forms a wireless network according to a predetermined wireless communication standard, a control unit which, if at least one terminal device is connected to the communication unit through the wireless network, determines whether it is required to perform warming-up of the image forming apparatus and performs warming-up of the image forming apparatus, and a storage unit which stores information regarding a connection status of the terminal device, and the control unit determines that warming-up is required in at least one of a case in which the wireless network is newly generated, the wireless network is re-generated, a terminal device is connected for the first time, and a terminal device having a history of being used approaches the image forming apparatus, performs warming-up of the image forming unit, and renews information stored in the storage unit.

A method of operating an image forming apparatus, according to an exemplary embodiment, includes forming a wireless network according to a predetermined wireless communication standard, if at least one terminal device is connected through the wireless network, determining whether a wireless network is newly generated, a wireless network is re-generated, a terminal device is connected for the first time, and a terminal device having a history of being used approaches the image forming apparatus, and performing warming-up of an image forming unit in the image forming apparatus in one of the cases.

An image forming apparatus, according to an exemplary embodiment, includes an image forming unit which performs an image forming job, a communication unit which forms a wireless network, and a control unit which, if at least one terminal device is connected to the communication unit through the wireless network formed by the communication unit, determines whether there is a possibility to use the image forming apparatus, and if it is determined that there is a possibility to use the image forming apparatus, changes a status of the image forming unit.

The control unit may determine a connection status of the terminal device using at least one of connection information of the terminal device, unique information of the terminal device, and strength of a signal received from the terminal device, determine whether there is a possibility to use the image forming apparatus based on the identified connection status, and if it is determined that there is a possibility to use the image forming apparatus, change a preparation status of the image forming unit from a stand-by status to a warming-up status.

The control unit may change a preparation status of the image forming unit from a stand-by status to a warming-up status if the connection status is at least one of a case where the terminal device is connected to the communication unit through a newly-generated network, the terminal device is connected to the communication unit through a network re-generated using a predetermined profile, and the terminal device is connected to the communication unit for the first time.

The control unit may change a preparation status of the image forming unit from a stand-by status to a warming-up status if the frequency of using the image forming apparatus by the terminal device exceeds a predetermined threshold value, and the strength of a signal received from the terminal device increases.

The control unit may determine a connection status of the terminal device using at least one of connection information of the terminal device, unique information of the terminal device, and strength of a signal received from the terminal device. If the terminal device is connected through the wireless network when a preparation status of the image forming unit is a low-power power-saving mode, and if it is determined that there is a possibility to use the image forming apparatus based on the identified connection status, the control unit may change a preparation status of the image forming unit from the low-power power-saving mode to a normal mode.

The control unit may change a preparation status of the image forming unit from the low-power power-saving mode to a normal mode if a connection status is at least one of a case where the terminal device is connected to the communication unit through a newly-generated network, the terminal device is connected to the communication unit through a network re-generated using a predetermined profile, and the terminal device is connected to the communication unit for the first time.

The control unit may change a preparation status of the image forming unit from the low-power power-saving mode to a normal mode if the frequency of using the image forming apparatus by the terminal device exceeds a predetermined threshold value, and the strength of a signal received from the terminal device increases.

Meanwhile, the image forming apparatus may further include a storage unit which stores connection information of the terminal device, unique information of the terminal device, and the strength of a signal received from the terminal device, and the control unit may update information stored in the storage unit according to the connection status of the terminal device.

The communication unit may form the wireless network according to a Wi-Fi direct standard, and the image forming apparatus may operate as a group owner in the wireless network.

The communication unit may include a Wi-Fi module unit which performs connection, transmission and reception of data according to a wireless communication standard, a device driver unit which communicates with the Wi-Fi module unit, and a WLAN driver unit which controls the Wi-Fi module unit through the device driver unit.

The control unit may include a Wi-Fi direct manager unit which generates or analyzes a packet according to the Wi-Fi direct standard, a WPS manager unit which generates and processes a WPS packet, a soft AP unit which processes a connection request of the terminal device, and a connection manager unit which forms the wireless network by controlling the Wi-Fi direct manager unit, the WPS manager unit, and the soft AP unit according to network configuration information, and a status changing manager unit which changes a status of the image forming apparatus if it is determined that there is a possibility to use the image forming apparatus.

A method of operating an image forming apparatus including an image forming unit, according to an exemplary embodiment, includes forming a wireless network, if at least one terminal device is connected to the image forming apparatus through the wireless network, determining whether there is a possibility to use the image forming apparatus according to a connection status of the terminal device, and if it is determined that there is a possibility to use the image forming apparatus, changing a status of the image forming unit.

The determining may include determining a connection status of the terminal device using at least one of connection information of the terminal device, unique information of the terminal device, and the strength of a signal received from the terminal device.

The determining may include determining that there is a possibility to use the image forming apparatus if a connection status is at least one of a case where the terminal device is connected to the image forming apparatus through a newly-generated network, the terminal device is connected to the image forming apparatus through a network re-generated using a predetermined profile, and the terminal device is connected to the image forming apparatus for the first time.

The determining may include determining that there is a possibility to use the image forming apparatus if the frequency of using the image forming apparatus by the terminal device exceeds a predetermined threshold value, and the strength of a signal received from the terminal device increases.

The changing a status of the image forming unit may include performing warming-up of the image forming unit.

The changing a preparation status of the image forming unit may include converting an operation mode of the image forming unit from a low-power power-saving mode to a normal mode.

The changing a preparation status of the image forming unit may include converting a current mode to a normal mode immediately if it is determined there is a possibility to use the image forming apparatus when a current operation mode of the image forming unit is in one of a plurality of low-power power-saving modes.

The image forming apparatus may form the wireless network according to a Wi-Fi direct standard, and the image forming apparatus may operate as a group owner in the wireless network.

As such, according to various exemplary embodiments, if a terminal device is connected through a wireless network, an image forming apparatus may change a preparation status automatically according to a connection status of the terminal device. Since the image forming apparatus is prepared, a user may use the image forming apparatus immediately. Accordingly, user convenience may be improved.

Features of the present general inventive concept may also be realized by an image forming apparatus including a connection unit to establish a communication connection with an external device, a condition analysis unit to determine whether a predetermined condition exists corresponding to a high likelihood that the image forming apparatus will receive an image forming request from the external device, and a controller to control the image forming apparatus to change from a power-save mode to an image-formation ready mode when it is determined that the predetermined condition exists.

The connection unit may be a wireless connection unit to establish a wireless network with the external device.

The condition analysis unit may include an a condition detection unit to detect a condition of the external device and a condition storage unit to store at least one predetermined condition. The determination whether the predetermined condition exists may be made prior to receiving a request from the external device to change to a ready mode.

The predetermined condition may include at least one of a first-time connection between the external device and the image forming apparatus, a determination that the communication connection with the external device may be a new network, and a determination that the external device has requested an image-forming operation of the image forming apparatus with at least a predetermined frequency.

When the predetermined condition is that the external device has requested the image-forming operation of the image forming apparatus with at least the predetermined frequency, the controller further may further determine a signal strength of the communication connection with the external device, and the controller may control the image forming apparatus to change from the power-save mode to the image-formation ready mode based on each of the predetermined condition and the signal strength of the communication connection with the external device.

The controller may compare a present signal strength of the communication connection with a previous signal strength of the communication connection, and may control the image forming apparatus to change from the power-save mode to the image-formation ready mode when it is determined that the signal strength has increased by a predetermined degree from the previous signal strength.

The image forming apparatus may further include an imaging unit, and at least one memory, wherein changing the image forming apparatus from the power-save mode to the image-formation ready mode may include at least one of increasing a voltage supplied to the imaging unit, enabling operation of the at least one memory, and increasing a power supplied to the controller.

Features of the present general inventive concept may also be realized by a method of controlling an image forming apparatus including establishing a communication connection between the image forming apparatus and an external device, determining whether a predetermined condition exists based on the communication connection, the predetermined condition corresponding to a high likelihood that the image forming apparatus will be requested by the external device to perform an imaging operation, and changing the image forming apparatus from a power-save mode to an image-formation ready mode when it is determined that the predetermined condition exists.

Establishing the communication connection may include receiving a wireless request from the external device to establish a wireless network connection with the image forming apparatus.

Determining whether the predetermined condition exists may include detecting a condition of the external device and comparing the condition of the external device with the predetermined condition stored in memory.

The determination whether the predetermined condition exists may be made prior to receiving a request from the external device to change to a ready mode.

The predetermined condition may include at least one of a first-time connection between the external device and the image forming apparatus, a determination that the communication connection with the external device may be a new network, and a determination that the external device has requested an image-forming operation of the image forming apparatus with at least a predetermined frequency.

When the predetermined condition is the determination that the external device has requested the image-forming operation of the image forming apparatus with at least the predetermined frequency, determining whether the predetermined condition exists further may include determining a signal strength of the communication connection with the external device, and changing the image forming apparatus from the power-save mode to the image-formation ready mode based on each of the predetermined condition and the signal strength of the communication connection with the external device.

The method may further include comparing a present signal strength of the communication connection with a previous signal strength of the communication connection, and changing from the power-save mode to the image-formation ready mode when it is determined that the signal strength has increased by a predetermined degree from the previous signal strength.

Changing the image forming apparatus from the power-save mode to the image-formation ready mode may include at least one of increasing a voltage supplied to an imaging unit, a memory, and a controller of the image forming apparatus.

The method may further include changing a mode of the image-forming apparatus to a next power-save mode when a command to enter the image-forming ready state is not received within a predetermined period of time.

Each next power-save mode may further reduce a power consumed by the image-forming apparatus compared to a respective previous power-save mode.

Features of the present general inventive concept may also be realized by an image-forming system including an image forming apparatus, and an external device to connect to the image forming apparatus to perform an imaging operation with the image forming apparatus. The image forming apparatus may include a connection unit to establish a communication connection with the external device, a probability determining unit to determine whether a predetermined condition exists corresponding to a high likelihood that the image forming apparatus will receive an image forming request from the external device, and a controller to control the image forming apparatus to change from a power-save mode to an image-formation ready mode when it is determined that the predetermined condition exists.

The image forming apparatus and the external device may be connected via a wireless network.

BRIEF DESCRIPTION OF THE DRAWINGS

These and/or other features of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
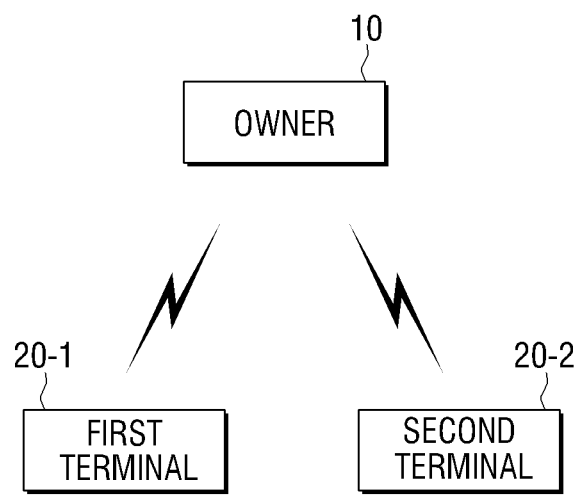
FIG. 1 is a view illustrating a wireless network including an image forming apparatus according to an exemplary embodiment.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

FIG. 1 is a view illustrating a wireless network including an image forming apparatus according to an exemplary embodiment. The image forming apparatus may form a network with other terminal devices or other nodes using various network communication standards.

For example, as illustrated in FIG. 1, a wireless network may be formed according to a Wi-Fi direct standard. The Wi-Fi direct standard is also referred to as a Wi-Fi P2P standard and a wireless network formed according to the Wi-Fi direct standard may be referred to as a wireless communication group which includes a Wi-Fi direct group owner 10 and Wi-Fi direct clients or terminals 20-1, 20-2.

The Wi-Fi direct group owner 10 plays a role similar to an access point in a conventional infrastructure environment, that is, it performs generating and managing of a Wi-Fi direct network. Specifically, a terminal serving as the owner 10 transmits a beacon message periodically, and transmits a packet to other terminals which are clients, in the group. In addition, the owner 10 stores and manages a routing table in which the address of each client is recorded. The owner 10 relays communication between clients using the routing table.

Meanwhile, the clients 20-1, 20-2 represents apparatuses which are connected to a network generated by the owner 10. The clients 20-1, 20-2 may connect to another client using the owner 10 or may be connected to the owner 10 to perform data communication.

As such, an image forming apparatus may be included in a network as a means to perform printing according to the Wi-Fi direct standard. An image forming apparatus may operate as the owner 10 or clients 20-1, 20-2.

With regard to a Wi-Fi direct standard in which an image forming apparatus operates as the owner 10, a Wi-Fi direct client apparatus to be connected to the image forming apparatus searches the apparatus serving as the owner 10. Subsequently, the Wi-Fi direct client apparatus selects an apparatus to be connected to from among the searched owners and makes a request for connection to the selected apparatus. A Wi-Fi Protected Setup (WPS) standard may be used during the connection process.

In a case where an image forming apparatus operates as the owner 10, a user connects to a wireless network formed by the owner 10 using its own terminal device. In this case, the image forming apparatus, that is, the owner 10, may change its preparation status after it approves connection with the terminal device even if no printing command is transmitted from the terminal device.

That is, according to an exemplary embodiment, an image forming apparatus may initiate warming-up of each engine units if the engine units are not warmed up yet. According to another exemplary embodiment, if an image forming apparatus operates in a power-saving mode, the power-saving mode may be changed to a normal mode immediately.

Meanwhile, a preparation status may be changed as described above only when there is a possibility that an image forming apparatus would be used while the image forming apparatus is connected to the terminal devices 20-1, 20-2. Settings may be implemented in the owner 10 to correspond to times when it is likely that the owner 10 will be accessed by a client.

That is, if a terminal device or a client forms a wireless network for the first time, it may be considered that there is a possibility of using the image forming apparatus. If a wireless network which has been formed previously is generated again using a profile used for forming the wireless network, it may be considered that there is a possibility of using the image forming apparatus. If there is a terminal device which connects to a wireless network which is already generated, it may be considered that there is a possibility of using the image forming apparatus. In addition, if a terminal device which has been used more than predetermined times approaches an image forming apparatus while being connected to a wireless network, it may also be considered that there is a possibility of using the image forming apparatus.

As such, if an event where there is a possibility that an image forming apparatus would be used has happened, the image forming apparatus may perform warming-up or change its mode or state.

Meanwhile, the above operation may also be applied when an image forming apparatus operates as a client. That is, if a wireless network is formed with another terminal device operating as the owner 10, the preparation status of the image forming apparatus may be changed, even if a printing command has not been input as an application to be executed on the image forming apparatus.

Figure 2:
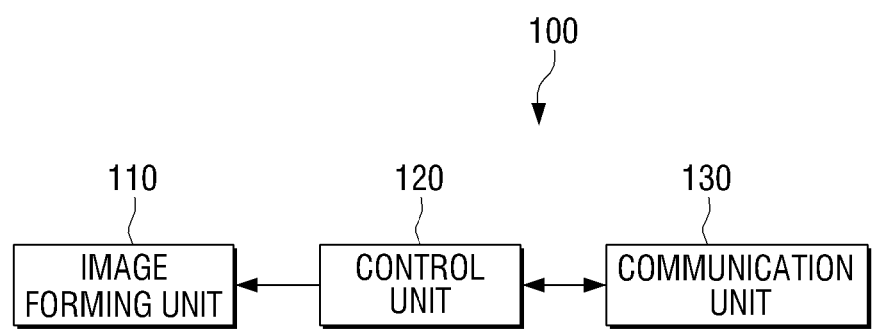
FIGS. 2 to 4 are block diagrams illustrating configurations of an image forming apparatus according to various exemplary embodiments.

FIG. 2 is a block diagram illustrating a configuration of an image forming apparatus 100 according to an exemplary embodiment. According to FIG. 2, the image forming apparatus 100 comprises an image forming unit 110, a control unit 120, and a communication unit 130.

The image forming unit 110 includes engine elements to perform an image forming job. In some cases, the image forming unit 110 may be referred to as an engine unit, and detailed configuration of the image forming unit 110 may be embodied differently according to an image forming method. For example, if an image forming apparatus 100 is a laser-type apparatus, the image forming unit 110 may include a photo conductor, a charging unit, a laser scanning unit, a developing unit, a transferring unit, and a fusing unit, and if an image forming apparatus 100 is an ink-jet-type apparatus, the image forming unit 110 may include an ink cartridge and a printer head.

In addition, the configuration of the image forming unit 110 may be embodied differently according to the type of the image forming apparatus 100. For example, if the image forming apparatus 100 is simply a scanner, only a scanner module may be included, if the image forming apparatus 100 is simply a printer, only a printer module may be included, and if the image forming apparatus 100 is a copier, a MFP, or a facsimile, both a scanner module and a printer module may be included.

The scanner module scans a document to convert the document into image data, and uses a Charge Coupled Device (CCD), a scan motor, and so on as main components. In contrast, the printer module prints image data on a paper, and in the case of a laser printer, a Laser beam Scanning Unit (LSU), a developer, a charging unit, a transferring unit, a fusing unit, and so on are used as main components.

The communication unit 130 forms a wireless network according to a wireless communication standard. Various known standards may be used as a the wireless communication standard. For example, a Wi-Fi direct standard may be used. The Wi-Fi direct standard may be used in various apparatuses which support IEEE 802.11a/b/g/n. Accordingly, the communication unit 130 performs wireless connection and transmitting/receiving of data by processing a wireless communication standard such as IEEE 802.11a/b/g/n.

If an external terminal device connects to a wireless network formed by the communication unit 130, the control unit 120 changes a preparation status of the image forming unit 110 according to a connection status of the terminal device.

Herein, the connection status means various statuses determined according to connection information which is used when the terminal device connects to the wireless network, unique information of the terminal device itself, information regarding connection history, information regarding usage history, information regarding the strength of a signal received from the terminal device, and so on.

The control unit 120 controls the image forming unit 110 to change its preparation status if it is determined that the preparation status of the image forming unit 110 needs to be changed based on its connection status, that is, if it is determined that the image forming apparatus 100 is likely to be used.

For example, the control unit 120 may control the preparation status of the image forming unit 110 by warming-up the image forming unit so that an image forming job may be performed immediately.

Figure 3:
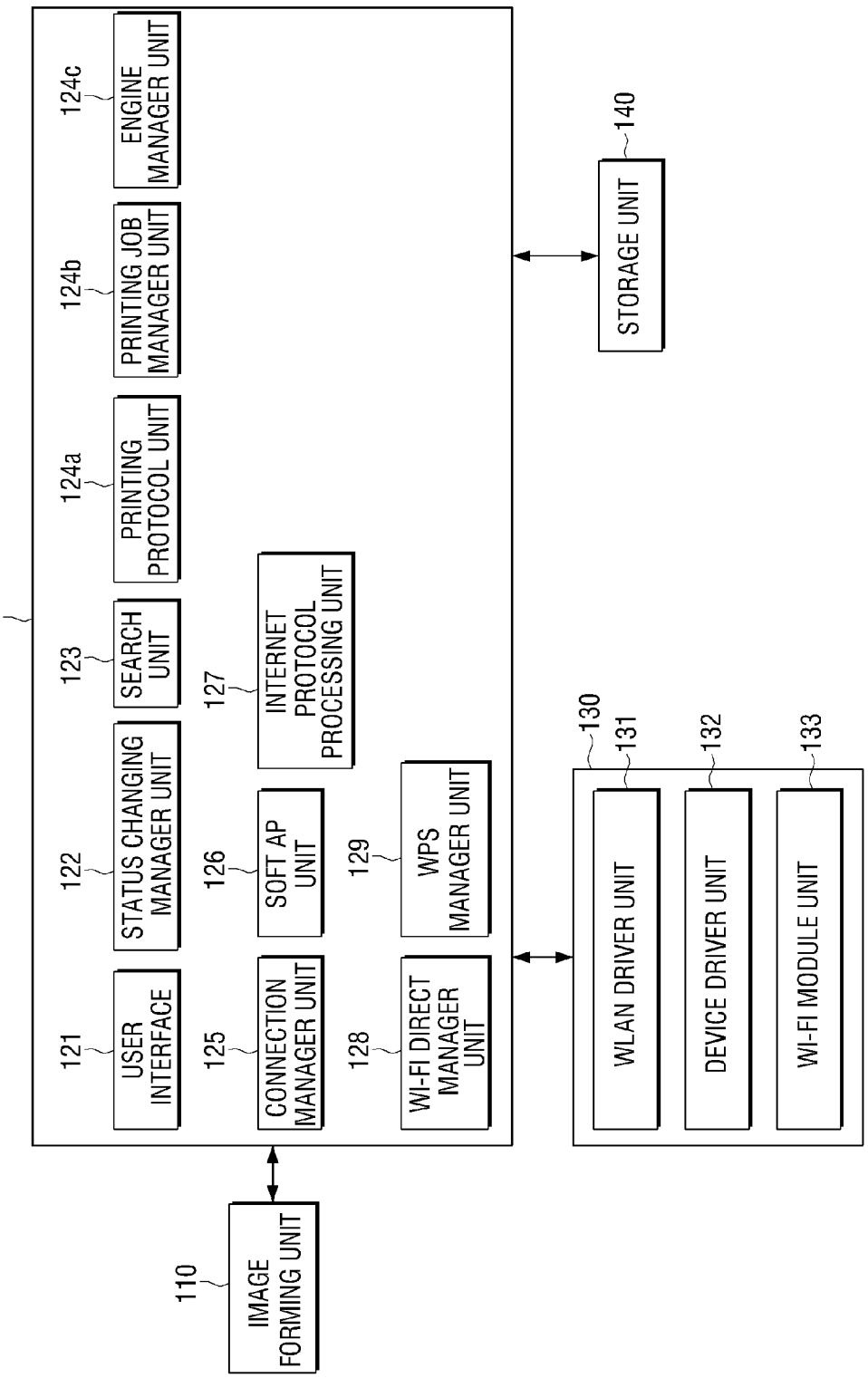

FIG. 3 is a block diagram illustrating an example of a detailed configuration of the image forming apparatus 100 according to the exemplary embodiment illustrated in FIG. 2. According to FIG. 3, the communication unit 130 comprises a WLAN driver unit 131, a device driver unit 132, and a Wi-Fi module unit 133, and the control unit 120 comprises a user interface 121, a status changing manager unit 122, a search unit 123, a printing standard unit 124a, a printing job manager unit 124b, an engine manager unit 124c, a connection manager unit 125, a soft Access Point (AP) unit 126, an internet standard processing unit 127, a Wi-Fi direct manager unit 128, and a WPS manager unit 129. In addition, according to FIG. 3, the image forming apparatus 100 may further include a storage unit 140.

The Wi-Fi module unit 133 in the communication unit 130 processes a wireless communication standard such as IEEE 802.11a/b/g/n. The Wi-Fi module unit 133 may directly control hardware for wireless communication and thus, perform wireless connection and transmitting/receiving of wireless data.

The device driver unit 132 drives the Wi-Fi module unit 133. The device driver unit 132 is connected to the Wi-Fi module unit 133 through a Universal Serial Bus (USB) or a Secure Digital Input/Output (SDIO) interface, and converts data transmitted from an upper layer to be in a form complying with an interface standard and transmits the converted data to the Wi-Fi module unit 133. In addition, the device driver unit 132 transmits data received from the Wi-Fi module unit 133 to the WLAN driver unit 131.

The WLAN driver unit 131 converts data transmitted from an upper layer into data which can be recognized by the Wi-Fi module unit 133 and transmits the converted data to the Wi-Fi module unit 133 through the device driver unit 132, thereby controlling the Wi-Fi module unit 133. That is, the WLAN driver unit 131 receives data from the control unit 120, converts the data to comply with a Wi-Fi standard, and transmits the converted data to the outside, or to an external device. In addition, the WLAN driver unit 131 converts data received from the outside to be in a form recognizable by the control unit 120 and transmits the converted data to the control unit 120.

Meanwhile, the Wi-Fi direct manager unit 128 in the control unit 120 processes a Wi-Fi direct communication standard. The Wi-Fi direct manager unit 128 generates a packet corresponding to the Wi-Fi direct standard according to a command transmitted from the connection manager unit 125 and transmits the packet to the WLAN driver unit 131 so as to transmit the packet to the outside, or to an external device. On the other hand, if a packet is transmitted from the WLAN driver unit 131, the Wi-Fi direct manager unit 128 performs a parsing process on the transmitted Wi-Fi direct packet and transmits the parsed packet to the connection manager unit 125.

The WPS manager unit 129 processes WPS enrollees and performs the WPS Registrar function. That is, if a request for WPS connection or a request for connection stand-by is received from the connection manager unit 125, the WPS manager unit 129 generates a WPS packet according to a WPS standard so that the WPS packet is transmitted through the WLAN driver unit 131 to an external node. On the other hand, if the WPS packet is transmitted through the WLAN driver unit 131, the WPS manager unit 129 processes the WPS packet. Accordingly, WPS connection may be performed between corresponding apparatuses.

The soft AP unit 126 serves as an access point. The soft AP unit 126 processes a connection request from an external terminal device using a routing table. In addition, the soft AP unit 126 transmits a message such as a beacon periodically to manage a wireless communication group. If a connection request is received from a client, the soft AP unit 126 may approve the request. Accordingly, an image forming apparatus 100 operates as an owner and completes preparation for performing TCP/IP communication with a terminal device through a Wi-Fi network.

The connection manager unit 125 controls the Wi-Fi direct manager unit 128, the WPS manager unit 129, and the soft AP unit 126 according to information regarding network configuration (such as, WLAN configuration) which is set through the user interface 121 and thus, may give instructions such as identifying a status of a wireless apparatus, requesting Wi-Fi direct connection, requesting WPS connection, and waiting for WPS connection. In addition, the connection manager unit 125 may control to operate the soft AP unit 126 to perform operation as an AP.

The internet standard processing unit 127 processes a TCP/IP packet and transmits the processed packet to an upper layer, or processes data received from an upper layer to comply with a TCP/IP standard and transmits the processed data to the WLAN driver unit 131. The connection manager unit 125 may perform tethering using the internet standard processing unit 127.

The user interface 121 provides a connection status to a user or provides an interface for receiving information regarding network configuration. The user interface 121 in FIG. 3 is set to be included in the control unit 120 for convenience of explanation, but this is only an example. That is, the user interface 121 includes an output means and an input means, and may be provided outside of the control unit 120. In this case, the user interface 121 may generate and provide a Graphic User Interface (GUI) screen to interface with a user.

The search unit 123 processes a search standard for informing a user of an apparatus connected to a wireless network or searching for an apparatus already connected to a wireless network.

The printing standard unit 124a processes print data input through a network according to a standard. Specifically, the printing standard unit 124a may process print data using a standard such as a standard TCP/IP printing standard (default 9100 port), an IPP (Internet printing standard: 631 port), an LPR (Lineprinter: 515 port), and so on.

The printing job manager unit 124b analyzes print data received through the printing standard unit 124a and converts the received data into a data format recognizable by the image forming unit 110.

The engine manager unit 124c controls the image forming unit 110. The engine manager unit 124c controls the image forming unit 110 to form an image using the data converted by the printing job manager unit 124b. In addition, the engine manager unit 124c controls the image forming unit 110 to perform warming-up, if necessary.

The status changing manager unit 122 receives information regarding a client that is connected through the operation of the soft AP unit 126 from the connection manager unit 125. The status changing manager unit 122 determines whether or not there is a possibility that the client would use the image forming apparatus, that is, the image forming apparatus 100 should be ready for performing a job, using the received information.

The operation of changing a status by the status changing manager unit 122 may be preset.

For example, it may be determined that there is a possibility that an image forming apparatus 100 would be used when a new network is generated by the Wi-Fi direct manager unit 128 and a terminal device is connected through the generated network.

In another example, it may be determined that there is a possibility that an image forming apparatus 100 would be used when a re-connection request is received from a terminal device as the soft AP unit 126 is operated, or when unique information of a terminal received from the connection manager unit 125 is not consistent with pre-stored unique information, that is, when a new terminal device is connected for the first time.

In addition, it may be determined that there is a possibility that an image forming apparatus 100 would be used when, with regard to a terminal device of which unique information is already stored, the number of uses of the image forming apparatus by the terminal device or the strength of a received signal of the terminal device exceeds a predetermined value. That is, the status changing manager unit 122 may calculate a frequency of use by dividing a number of times an image forming job is performed based on a request by the terminal device by a number of times a connection is made between the apparatus and the terminal device, and if the calculated frequency of use exceeds a threshold value, may identify the strength of a signal received from the terminal device. If the strength of the received signal exceeds a predetermined value or is increasing, it may be determined that the terminal device is approaching the image forming apparatus 100 and thus, the image forming apparatus 100 is likely to be used.

As such, if one of the predetermined conditions is satisfied, the status changing manager unit 122 may determine that there is a possibility that the image forming apparatus 100 would be used and changes the status of the image forming unit 110. Meanwhile, the conditions to change a status are not limited to the above-mentioned cases and additional conditions may be set. In addition, all of the set conditions may be used, or only part of the conditions may be used.

Changing of a status may be performed according to various exemplary embodiments. For example, the status changing manager unit 122 may warm-up the image forming unit 110 and other components. In this case, the status changing manager unit 122 may warm-up all of the components included in the image forming apparatus 100 or only part of the components, according to the type of an image forming job.

Specifically, in the case of a scanner module, preparation should be completed prior to performing a scanning job, that is, a fluorescent lamp of CCD should be turned on and a scan motor should be driven. In the case of a printer module, a fusing lamp of a fusing unit should be heated to a predetermined temperature and a motor should be driven prior to performing a printing job. Such preparation may be regarded as a warming-up operation.

The control unit 120 may provide warming-up power to each module or each unit by controlling a power unit such as Switching Mode Power Supply (SMPS) to warm-up not only a scanner module or a printer module but also each component of the image forming apparatus 100 for performing an image forming job.

In addition, if warming-up is being performed or completed, information regarding this status may be displayed on a display (not shown). An LCD screen or a simple Light Emitted Diode (LED) may be used as the display.

Meanwhile, in another exemplary embodiment, the status changing manager unit 122 may change the operation mode of the image forming apparatus 100 or the image forming unit 110 instead of performing the above-mentioned warming-up. As low-power becomes an issue these days, a power-saving mode of the image forming apparatus 100 may be changed by going through a plurality of steps. For example, the power-saving mode of the image forming apparatus 100 may be changed by stages or sequentially in the order of a first power-saving mode, in which an operation frequency of a volatile memory and a CPU in the image forming apparatus 100 is decreased, a second power-saving mode, in which the volatile memory is changed to a self-refresh mode, a third power-saving mode, in which an operation frequency of the CPU is lowered to a minimum CPU operation frequency and power provided to a function unit of the image forming apparatus 100 is cut off, and a fourth power-saving mode, in which power provided to the volatile memory is cut off according to an amount of a stand-by time with no input, which will be explained in detail with reference to a corresponding exemplary embodiment.

Meanwhile, the storage unit 140 included in the image forming apparatus may store a variety of information or programs. For example, the storage unit 140 may store connection information, unique information, and information regarding signal strengths of clients, history information such as frequency of use, the number of times of use, the number of times of connection, and connection time, and information regarding a threshold value.

If a terminal device, that is, a client is connected, the control unit 120 may update information pre-stored in the storage unit 140 according to a connection status. For example, the number of connections made may be increased, or the frequency of user or connection time may be updated. If a new terminal device is connected, unique information may be added. In addition, new conditions to change a status may be set.

Figure 4:
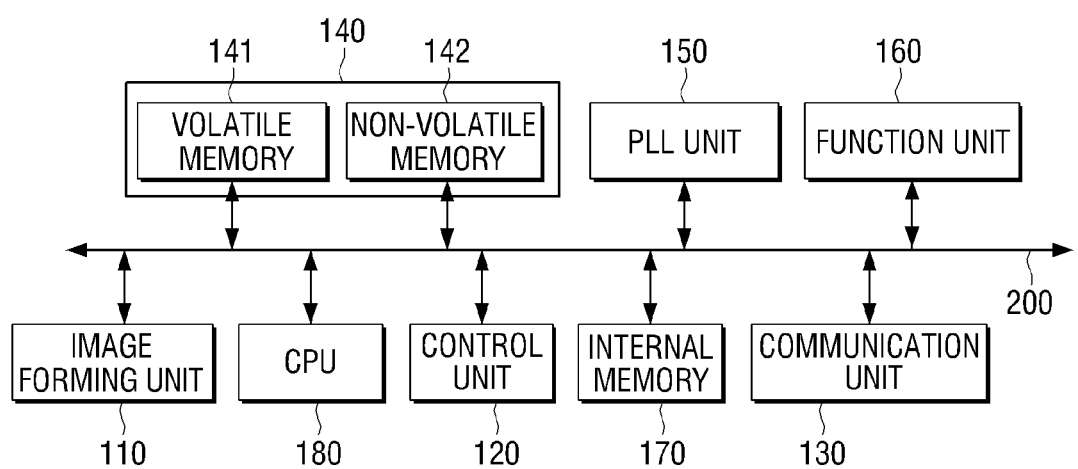

FIG. 4 is a block diagram to explain another example of configuration of the image forming apparatus 100 according to an exemplary embodiment. According to FIG. 4, the image forming apparatus 100 may include various components connected through a bus 200. That is, the image forming apparatus 100 may comprise various components such as the image forming unit 110, the control unit 120, the communication unit 130, the storage unit 140, a PLL unit 150, a function unit 160, an internal memory 170, and a CPU 180. Meanwhile, the control unit 120 may be embodied as a System on Chip (SoC) along with other components such as the CPU 180 and the internal memory 170. In addition, the image forming apparatus 100 may further include a component such as an interface unit (not shown), but such a component is not illustrated for convenience of explanation.

The storage unit 140 may include a volatile memory 141 and a non-volatile memory 142, and various types of data and programs may be stored in the volatile memory 141 and the non-volatile memory 142. The control unit 120 may control various functions using the data and programs stored in the memories.

The volatile memory 141 has a large scale in comparison with internal memory 170, which is separately provided and may be embodied as a DRAM. The volatile memory 141 is disposed in the control unit 120 or outside of a SoC including the control unit 120. Since the volatile memory 141 has a capacitance component, the volatile memory 141 may be discharged as time elapses. Accordingly, in order to maintain stored data, the volatile memory 141 performs a refresh operation.

The non-volatile memory 142 is also disposed in the control unit 120 or outside of a SoC including the control unit 120. The non-volatile memory 142 stores booting information. The non-volatile memory 142 may be embodied as a ROM. When a power-saving mode is changed to a normal mode, the non-volatile memory 142 may provide necessary information to change modes to the volatile memory 141.

The function unit 160 performs various functions supported by an image forming apparatus 100 by performing various programs under the control of the control unit 120. Specifically, the function unit 160 may perform various functions such processing an image and compressing or decompressing of an image which are the functions that need to be performed in an image forming job such as printing, copying, and scanning.

The PLL unit 150 in FIG. 4 generates various operation frequencies and provides these to each component using the operation frequencies. For example, the PLL unit 150 may generate a normal operation frequency of the CPU 180 of 600 MHz, a first operation frequency of 133 MHz, and a minimum operation frequency of 33 MHz. In addition, the PLL unit 150 may generate a normal operation frequency of the volatile memory 141 of 300 MHz and a minimum operation frequency of 133 MHz. In addition, the PLL unit 150 may generate an operation frequency of a signal output from an interface unit (not shown) of 166 MHz and 41.5 MHz. However, the above-mentioned frequency is only an example, and a frequency may change according to a type of the CPU 180 and the volatile memory 141.

The internal memory 170 may store a program to change the volatile memory 141 to a self-refresh mode, a program to control the PLL unit 150 to change a frequency, a program to analyze (or to determine) an external signal input through an interface unit, a program for restoring a power-saving mode to a normal mode, information regarding a pre-determined time to change a normal mode to a power-saving mode, information regarding conditions to change a mode between various power-saving modes, and information regarding a frequency to be changed to. Herein, the information may be in various formats such as a program, a code, and data. The internal memory 170 may be a small-scale volatile memory and may be embodied as an SRAM.

The CPU 180 may provide a command to the control unit 120 so that each component of the image forming apparatus 100 may perform its operation. Specifically, the CPU 180 may perform an operation by accessing the volatile memory 141 in a normal mode and in some power-saving modes and accessing the internal memory 170 in other power-saving modes. Accordingly, power of the storage unit 140 may be cut off in some power-saving modes.

The control unit 120 may control overall operation of the image forming apparatus 100, and may comprise a memory control unit (not shown), a power control unit (not shown), and a main control unit (not shown) in addition to the configuration illustrated in FIG. 3. Each of the components may be embodied as a single element. The control unit 120 may perform various operations using various memories such as the volatile memory 141 and the non-volatile memory 142.

Meanwhile, if one of the above conditions to change a status is satisfied, that is, if it is determined that there is a possibility that an image forming apparatus 100 would be used when a terminal device is connected through a wireless network, the control unit 120 changes a status. In FIG. 4, changing an operation mode from among various operations to change a status is described.

An image forming apparatus 100 may operate in a power-saving mode to realize low-power operation. Usually, an image forming apparatus 100 may enter into a power-saving mode if there is no input from a user for a predetermined time or if the image forming apparatus 100 is not used for a pre-determined time. Alternatively, a user may input a command to enter into a power-saving mode directly or through a host. There may be only one power-saving mode or a plurality of power-saving modes according to an apparatus 100. In this case, the longer the user's input is, the stronger the power-saving mode becomes sequentially. If a user inputs a command to return to a normal mode directly or through a host, if a specific key is touched, or one of the above-mentioned conditions to change a status is satisfied, an image forming apparatus 100 which stands by in a power-saving mode may be changed to be in a normal mode automatically. In this case, conversion to a normal mode may be performed in each power-saving mode or by going through a plurality of power-saving modes sequentially. That is, conversion to a normal mode may be performed as a power saving mode is changed from the highest power-saving mode to the next highest power-saving mode and finally to a normal mode sequentially.

In a power-saving mode, the control unit 120 may copy information stored in the volatile memory 141 in an internal memory (not shown) and use the copied information, and may reactivate and use the volatile memory 141 when the mode is returned to a normal mode.

For example, four power-saving modes may be provided according to each power consumption level.

Figure 5:
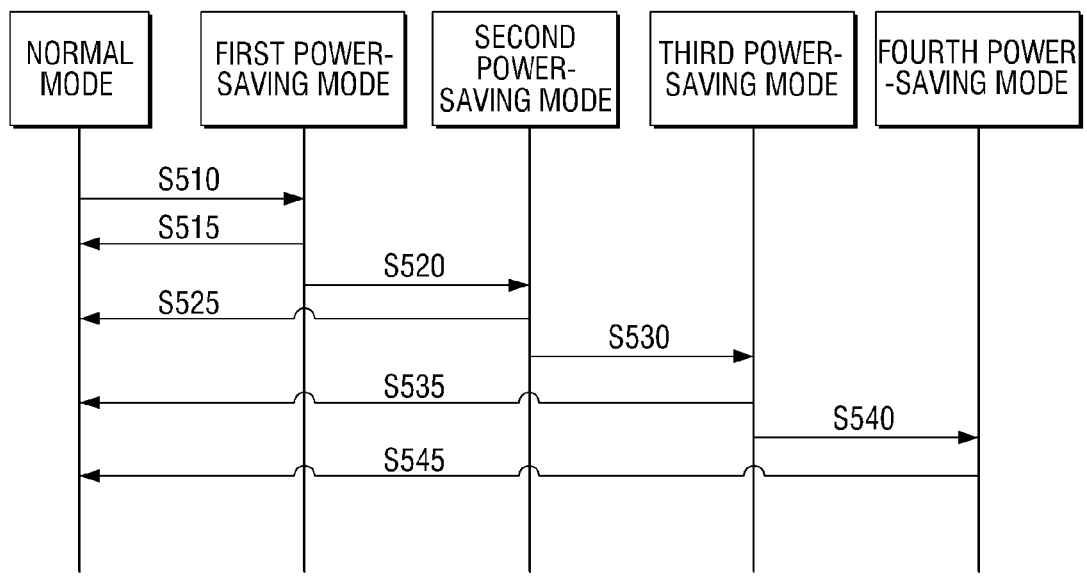
FIGS. 5 and 6 are views illustrating an examples of changing the status of an image forming apparatus.

First of all, as illustrated in FIG. 5, if the image forming apparatus 100 is in a normal mode, the CPU 180 performs an operation (that is, accesses a program) using a program stored in the volatile memory 141 and thus, information for performing various operations of the function unit 160 may be stored in the internal memory 170.

In this case, if there is no input for a first period of time, the image forming apparatus 100 converts its mode into the first power-saving mode (S510). In the first power-saving mode, various information that have been stored in the volatile memory 141 when the mode is a normal mode are copied and stored in the internal memory 170. In addition, an operation frequency of the volatile memory 141 is decreased to a minimum operation frequency, and an operation frequency of the CPU 180 is decreased to the first operation frequency. For example, if the operation frequency of the volatile memory 141 is 300 MHz, the minimum operation frequency of the volatile memory 141 may be 133 MHz. In another example, if the operation frequency of the CPU 180 is 600 MHz, the first operation frequency may be 133 MHz. Accordingly, the power consumed by a SoC in the first power-saving mode may be approximately 1.3 W~1.4 W.

In the first power-saving mode, if the CPU 180 determines that an external signal for instructing conversion of the power-saving mode to a normal mode, that is, a normal mode conversion signal, is input within a predetermined second period of time, the image forming apparatus 100 changes from the first power power-saving mode to the normal mode (S515). Conversely, if the CPU 180 determines that the normal mode conversion signal is not received within the predetermined second period of time, the image forming apparatus 100 converts the first power-saving mode into the second power-saving mode (S520).

In the second power-saving mode, the control unit 120 performs a program jump according to a command of the CPU 180 so that the CPU 180 may operate using information copied in the internal memory 170, and converts the mode of the volatile memory 141 from a normal operation mode to a self-refresh mode. In this case, if another external signal, instead of a normal mode conversion signal, is input, the self-refresh mode may be maintained. Accordingly, the CPU 180 may operate by accessing the small-scale internal memory 170 and thus, power consumption may be reduced. As a result, the power consumed by a SoC in the second power-saving mode may be approximately 0.9 W~1 W.

In the second power-saving mode, if a normal mode conversion signal is input within a predetermined third period of time, the image forming apparatus 100 changes from the second power-saving mode to the normal mode (S525). Conversely, if the conversion signal is not input for the predetermined third period of time, the image forming apparatus 100 may convert its mode into the third power-saving mode (S530). In the third power-saving mode, the control unit 120 may lower the operation frequency of the CPU 180 to a minimum operation frequency and cut off power provided to the function unit 160 according to a command of the CPU 180. For example, if the first operation frequency of the CPU 180 is 133 MHz, the minimum operation frequency of the CPU 180 may be 33 MHz. If an operation module (not shown) is included in addition to the function unit 160, such an operation module may also be turned off. Since the function unit 160 is turned off and the operation frequency of the CPU 180 is lowered to a minimum operation frequency, power consumption may be reduced more in the third power-saving mode than in the second power-saving mode. That is, the power consumed by a SoC in the third power-saving mode may be approximately 0.6 W~0.7 W. Accordingly, the entire power consumed by the image forming apparatus 100 in the third power-saving mode may be reduced to approximately less than 1 W.

Meanwhile, according to another exemplary embodiment, cut-off of power provided to the function unit 160 may be performed in the second power-saving mode. In addition, the operation frequency of a signal received from an interface unit may be changed from 133 MHz to 33 MHz in the third power-saving mode.

In the third power-saving mode, if an external signal for instructing conversion of the power-saving mode to a normal mode, that is, a normal mode conversion signal, is input within a predetermined fourth period of time, the image forming apparatus 100 changes from the third power-saving mode to the normal mode (S535). Conversely, if the normal mode conversion signal is not input for the predetermined fourth period of time, the image forming apparatus 100 may convert the third power-saving mode into the fourth power-saving mode (S540).

In the fourth power-saving mode, the control unit 120 cuts off power provided to the volatile memory 141 according to a command of the CPU 180.

Since the volatile memory 141 is turned off, power consumption may be reduced more in the fourth power-saving mode than in the third power-saving mode. That is, the power consumed by a SoC in the fourth power-saving mode may be approximately 0.4 W~0.5 W. Accordingly, the entire power consumed by the image forming apparatus 100 in the fourth power-saving mode may be reduced to significantly less than 1 W.

In the fourth power-saving mode, if the normal mode conversion signal is input, the image forming apparatus 100 changes from the third power-saving mode to the normal mode (S545).

In the exemplary embodiment, an operation frequency used in such a memory as the volatile memory 141 is referred to as a memory operation frequency, and an operation frequency used in the CPU 180 is referred to as a CPU operation frequency for convenience of explanation.

In addition, the above-mentioned various operation frequencies and power values are only examples, and they may be changed according to the characteristics and the number of each component and the characteristics of the image forming apparatus 100. That is, the above figures are not limited to those in the specification.

The four power-saving modes have been described above, but the image forming apparatus 100 may operate in various power-saving modes. If an external terminal device is connected to the communication unit 130 through a wireless network while the image forming apparatus 100 operates in one of the power-saving modes, whether there is a possibility that the image forming apparatus 100 may be used is determined according to a connection status and so on, and the operation mode may be converted to a normal mode immediately or sequentially.

Figure 6:
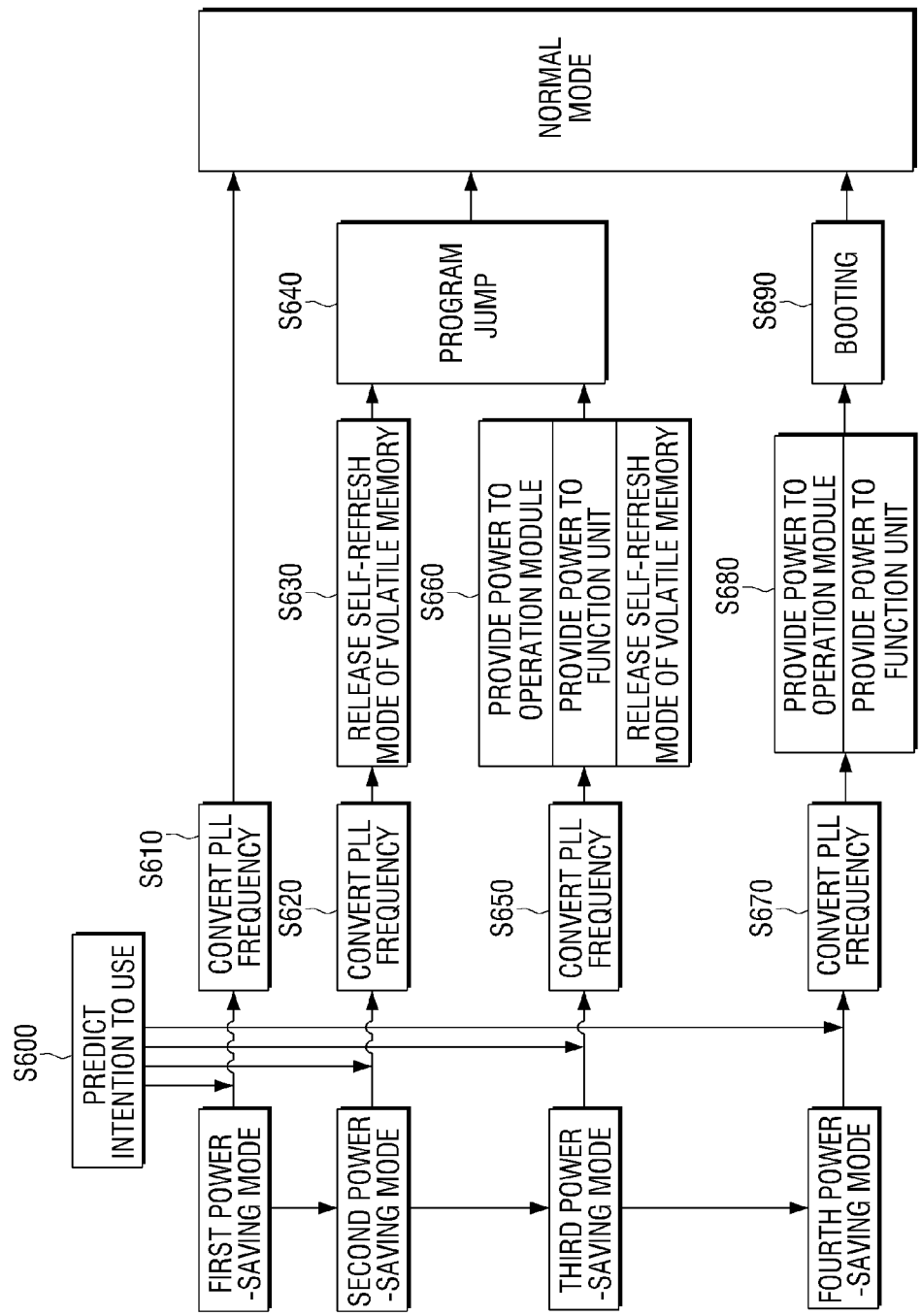

FIG. 6 is a view to explain detailed operations performed in each process of returning to a normal mode. According to FIG. 6, if a terminal device is connected to the communication unit 130 through a wireless network while the image forming apparatus 100 operates in the first power-saving mode, and it is determined that there is a possibility that the image forming apparatus 100 would be used (S600), the control unit 120 changes the operation frequencies of the CPU 180 and the volatile memory 141 to 600 MHz and 300 MHz, respectively (S610) to convert the power-saving mode of the image forming apparatus 100 to a normal mode.

If a terminal device is connected to the communication unit 130 through a wireless network while the image forming apparatus 100 operates in the second power-saving mode, and it is determined that there is a possibility that the image forming apparatus 100 would be used (S600), the control unit 120 changes the operation frequencies of the CPU 180 and the volatile memory 141 to 600 MHz and 300 MHz, respectively (S620) and releases a self-refresh mode of the volatile memory 141 (S630). In addition, the CPU 180 may perform a program jump so as to access and use a program stored in the volatile memory 141 (S640).

If a terminal device is connected to the communication unit 130 through a wireless network while the image forming apparatus 100 operates in the third power-saving mode, and it is determined that there is a possibility that the image forming apparatus 100 would be used (S600), the control unit 120 changes the operation frequencies of the CPU 180 and the volatile memory 141 to 600 MHz and 300 MHz, respectively (S650). In addition, the control unit 120 may provide power to the function unit 160, an operation module (not shown) and so on, and may release a self-refresh mode of the volatile memory 141 (S660). In addition, a program jump may be performed so that the CPU 180 which has used a program stored in the internal memory 170 in the third power-saving mode may use a program stored in the volatile memory 141 (S640). Accordingly, the image forming apparatus 100 may be converted to be in a normal mode.

If a terminal device is connected to the communication unit 130 through a wireless network while the image forming apparatus 100 operates in the fourth power-saving mode, and it is determined that there is a possibility that the image forming apparatus 100 would be used (S600), the control unit 120 changes the operation frequencies of the CPU 180 and the volatile memory 141 to 600 MHz and 300 MHz, respectively (S670). In addition, the control unit 120 provides power to the function unit 160, an operation module and so on (S680). The control unit 120 also initiates the volatile memory 141 to copy data necessary to operate the image forming apparatus 100 in a normal mode, that is, booting information, and stores the copied information in the volatile memory 141. Accordingly, the volatile memory 141 performs booting using the copied booting information while the fourth power-saving mode is converted to a normal mode (S690). Since the booting operation performed when the volatile memory 141 is turned on after being turned off is a usual booting operation, detailed description regarding the booting operation will not be provided.

As such, it takes more time to return to a normal mode as a mode proceeds to the fourth power-saving mode. As the mode is automatically converted to a normal mode by sensing a possibility that an image forming apparatus 100 would be used when a user is contacted without a normal mode conversion signal, a user may not waste time unnecessarily.

Figure 7:
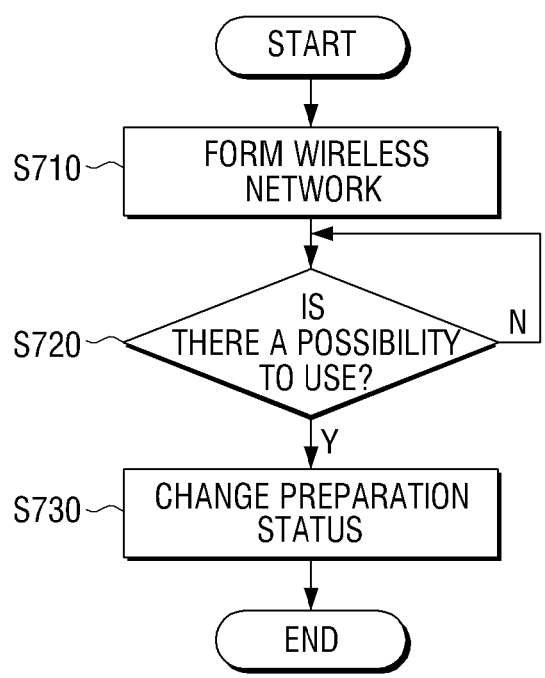
FIG. 7 is a flowchart to explain a method of operating an image forming apparatus according to an exemplary embodiment.

FIG. 7 is a flowchart to explain a method of operating the image forming apparatus 100 according to an exemplary embodiment.

According to FIG. 7, the image forming apparatus 100 may form a wireless network along with at least one terminal device (S710), and various wireless communication standards may be used to form a wireless network. For example, the image forming apparatus 100 may be connected to a terminal device according to a Wi-Fi direct standard. Meanwhile, the image forming apparatus 100 may operate as an owner in a wireless network, that is, a wireless communication group, which is formed according to a Wi-Fi direct standard.

In this state, the image forming apparatus 100 determines whether there is a possibility that the image forming apparatus 100 would be used considering a connection status of the terminal device (S720). For example, the image forming apparatus 100 may determine whether there is a possibility that the image forming apparatus 100 would be used considering various parameters such as network formation or connection information, unique information, and strength of signal reception together. In particular, the image forming apparatus 100 may determine whether there is a possibility that the image forming apparatus 100 would be used based on a database regarding a time zone when the image forming apparatus 100 is frequently used and a terminal device which is used frequently by a user.

If it is determined that there is a possibility that the image forming apparatus 100 would be used, a preparation status is changed accordingly (S730). For example, a module to perform an image forming job would be warmed-up in advance.

In another exemplary embodiment, an operation mode of the image forming apparatus 100 may be changed. For example, since it is difficult to perform an image forming job immediately in a power-saving mode, the mode of the image forming apparatus 100 may be changed to a normal mode immediately when it is determined that a terminal device which is likely to use the image forming apparatus 100 is connected. In this case, even if the image forming apparatus 100 is in the lowest power-saving mode from among a plurality of power-saving modes, the mode of the image forming apparatus 100 may be returned to a normal mode immediately.

Figure 8:
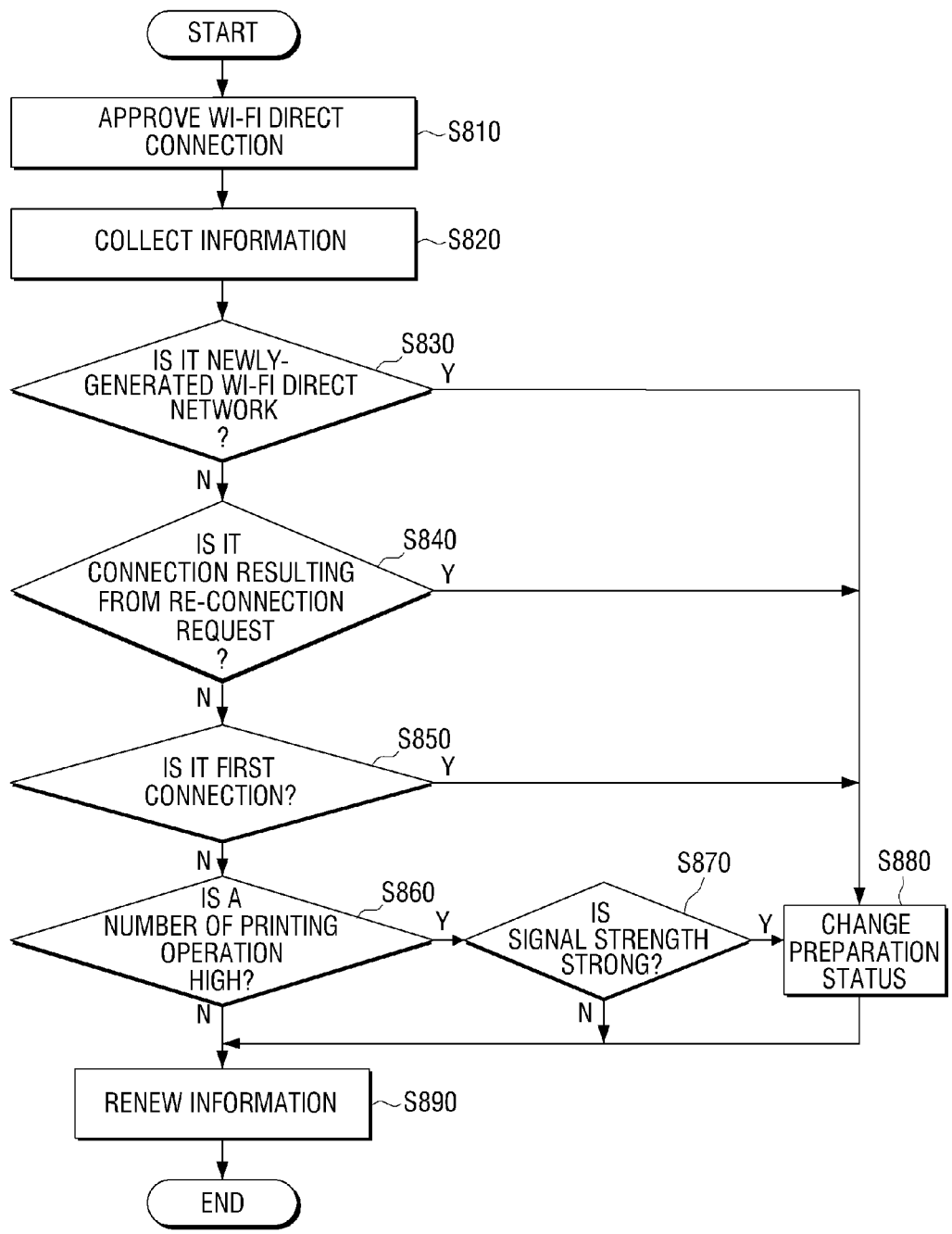
FIG. 8 is a flowchart to explain a method of operating an image forming apparatus in greater detail according to an exemplary embodiment.

FIG. 8 is a flowchart to explain a method of operating an the image forming apparatus 100 in greater detail according to an exemplary embodiment.

According to FIG. 8, if a connection request is received from a terminal device, the connection request is approved after determining whether to approve the connection request (S810). The connection with the terminal device may be performed in various methods. For example, the connection may be performed through a WPS button push method. That is, if a WPS button of the image forming apparatus 100 and a WPS button of the terminal device are selected in sequence within a predetermined period of time (for example, within 10 seconds), the two terminals may be connected with each other.

As such, if the connection with the terminal device is approved, relevant information is collected (S820). Herein, the information includes at least one of connection information of the terminal device, unique information of the terminal device, and the strength of a signal received from the terminal device. The connection information may be connection history information or routing information of the terminal device. The unique information represents information for identifying a terminal device and includes the unique identification or IP, name, manufacturer, and product number of the terminal device. Using such unique information and connection information, the image forming apparatus 100 may determine whether a connection is performed through a newly-generated wireless network, an existing wireless network, or a re-generated wireless network, and whether or not a terminal device is connected for the first time. In addition, if information regarding the strength of the signal reception is collected, whether or not a terminal device approaches the image forming apparatus 100 may be determined based on the information regarding the strength of the signal reception. Such a determination may be performed regarding in its entirety, sequentially, or only partially. According to FIG. 8, whether or not a network is a newly-generated Wi-Fi direct network may be determined (S830). If it is determined that a network is a newly-generated Wi-Fi direct network, a preparation status is changed (S880).

On the contrary, if a network is not a newly-generated Wi-Fi direct network, whether or not it is a connection requested again after being released is determined (S840). If it is determined that it is a re-connection, the image forming apparatus 100 changes its preparation status (S880).

If it is not a connection resulting from a re-connection request, whether a corresponding terminal device is connected for the first time is determined (S850). If it is determined that the terminal device is a device connected for the first time, the image forming apparatus 100 changes its preparation status (S880).

On the other hand, if the terminal device is not a device connected for the first time, whether printing has been performed frequently by the corresponding terminal device is determined (S860). In this case, whether printing has been performed more than a predetermined threshold value may be determined.

If it is determined that printing has been performed frequently, whether the strength of a signal is strong or not may be determined (S870). In this case, whether the strength of the signal is strong or not may be determined by comparing the strength of the signal with a predetermined threshold value or by comparing the strength of a current signal with the strength of a previous signal sequentially. If it is determined that the strength of the current signal is stronger than the strength of the previous signal, the image forming apparatus 100 changes its preparation status (S880). On the other hand, if it is determined that printing has not been performed frequently or the strength of the signal is not getting stronger, connection information or unique information of a client, or information regarding the number of times of connections is renewed (S890).

Meanwhile, the change of a preparation status may be a warming-up operation or the operation of converting a power-saving mode into a normal mode.

Figure 9:
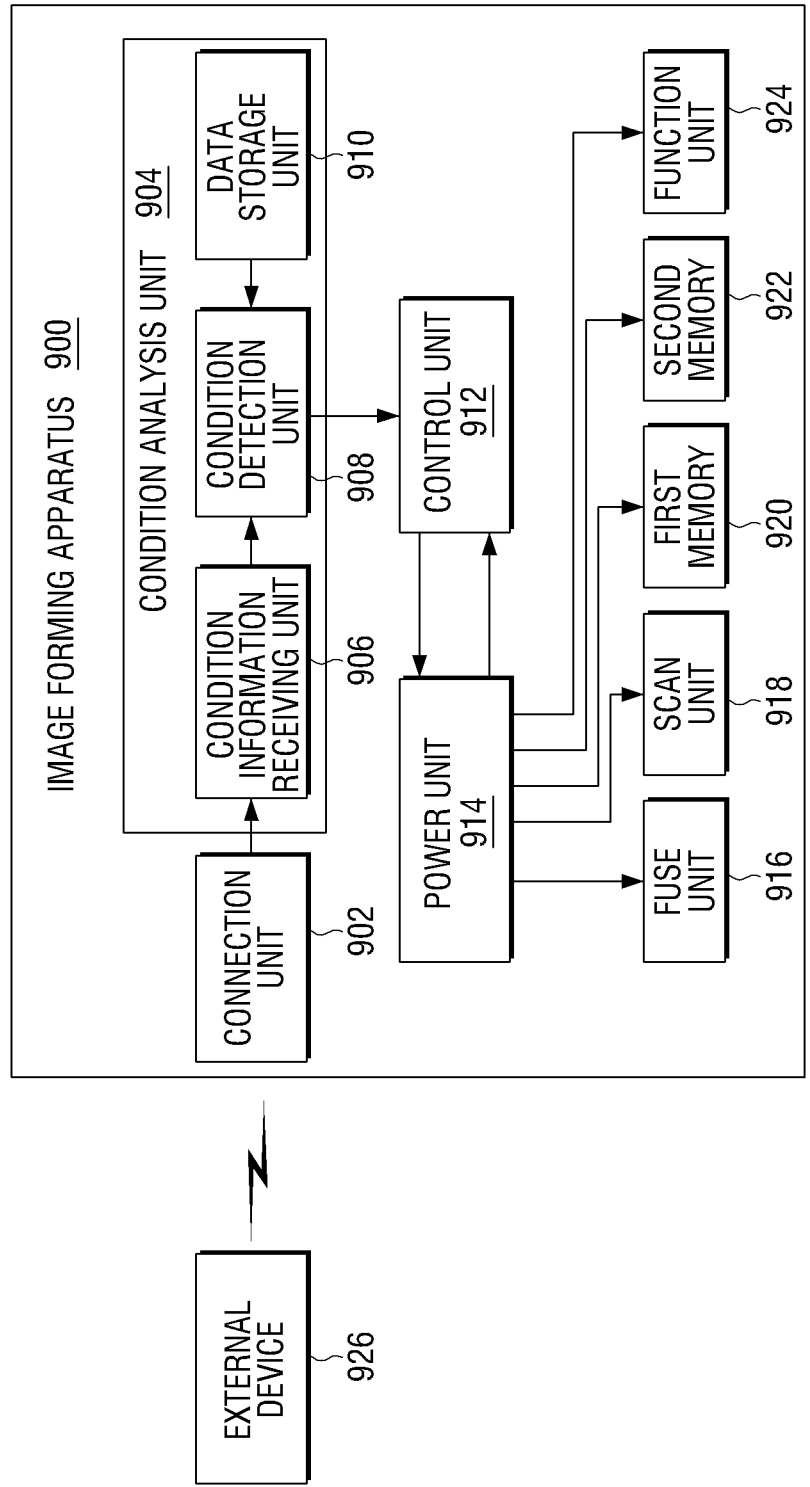
FIG. 9 is a block diagram of a configuration of an image forming apparatus according to an embodiment of the present general inventive concept.

FIG. 9 is a block diagram to illustrate an embodiment of the present general inventive concept. An image forming apparatus 900 may include a connection unit 902 to connect to an external device 926, a condition analysis unit 904, a control unit or controller 912, a power unit 914, and a plurality of function units 916 through 924. The external device 926 may request a wireless connection with the image forming apparatus 900. The connection unit 902 may detect the request, and may determine whether to grant the request. If the request is granted, a wireless connection may be established between the devices.

The connection unit 902 may receive information such as condition information from the external device 926 and may transmit the condition information to the condition analysis unit 904. The condition analysis unit 904 may include programs stored in memory executed by the control unit 912 or another processing unit to perform a detection operation and to store data. In addition, the condition analysis unit 904 may include memory, logic, and at least one processing unit separate from the control unit 912.

The condition information may include device identification information and signal strength information, for example. The condition information receiving unit 906 may receive the condition information from the connection unit 902. For example, the condition information receiving unit 906 may determine which information received by the connection unit 902 corresponds to condition information. The data storage unit 910 may store predetermined condition information, and the condition detection unit 908 may compare the condition information received from the external device 926 with the predetermined condition information stored in the data storage unit 910. For example, the condition detection unit 908 may receive device identification information from the external device 926, and may determine that the external device is connecting with the image forming apparatus 900 for the first time, based on an access table stored in the data storage unit 910. Alternatively, the condition detection unit 908 may determine that the external device 926 is attempting to re-establish a previous connection, or that the external device 926 frequently performs an imaging operation. When the condition detection unit 908 determines that the predetermined condition has been met, the condition detection unit 908 may output a signal to the control unit 912 to indicate that the condition has been met.

The control unit 912 may control the power unit 914 to increase power to one or more of the control unit 912 and the function units 916 to 924. For example, the power unit 914 may increase power to the fuse unit 916 to heat the fusing mechanism to prepare for printing. In addition, the power unit 914 may increase power to the scan unit 918 to turn on a motor, a lamp, or any other scan mechanism. In addition, the power unit 914 may increase power to a first memory 920 or a second memory 922 to enable the memory 920 or 922 or to read a program from the memory 920 or 922 to prepare for an imaging operation. The first and second memory 920 and 922 may be different types of memory, such as volatile and non-volatile memory, ROM and RAM, or flash memory and a hard disk, for example. In addition, the power unit 914 may increase power to any other function unit 924, such as a user interface or other device or component of the image forming apparatus 900.

As discussed above, the control unit 912 and function units 916 to 924 may be powered-up at the same time. Alternatively, one or more function units 916 to 924 may selectively be powered up to place the image forming apparatus 900 in a ready state. For example, if the condition detection unit 908 detects that the external device 926 has previously requested a printing operation, the control unit 912 may control only the fuse unit 916 and one or more of the first and second memory devices 920 and 922 to be powered up.

According to the present general inventive concept, a "normal" mode or status corresponds to a "ready" state, or an image-formation ready state, in which the image forming apparatus is warmed up and prepared to perform an imaging operation without the need to increase power to functional units that perform the imaging function. In contrast, the low-power or power-save mode or state corresponds to a state in which one or more components of the image forming apparatus are powered-down to conserve power. The powered-down components including imaging components, the control unit, and memory, so that a delay exists between receipt of an imaging operation and the performance of the imaging operation.

However, according to the present general inventive concept, since a warm-up operation begins before a request is received to perform an imaging operation, the time between receipt of the request and performance of the imaging operation is decreased, which increases convenience to a user. And since the change of state from the power-save state to the normal state is based on a likelihood that an imaging operation will be requested, power may still be conserved by not powering up in situations in which it is less likely that an imaging operation will be requested.

Although the present specification and claims refer to basing a power-up on a likelihood that an imaging operation will be requested, it should be noted that such a request may not be received, or the conditions set may not actually correspond to an increased likelihood that the imaging request will be received. Instead, the predetermined conditions are set by a user, manufacturer, vendor, or other entity based on the entity's experience or understanding of the situations in which an external device is likely to request an imaging operation. While the above-described examples may correspond to an increased likelihood of an imaging operation request in some environments, they may not correspond to an increased likelihood of an imaging request in every environment. In addition, the predetermined conditions that correspond to an increased likelihood of receiving an imaging request are not limited to those described in the present specification, but may be adapted by one of ordinary skill in the art to correspond to the particular circumstances of the environment in which an image forming apparatus may be used.

As described above, a preparation status may be changed so that an image forming apparatus may be prepared to perform an image forming job even before receiving print data. Since warming-up or conversion to a normal mode is performed just as a Wi-Fi direct client is connected, a first page may be printed in a relatively short period of time, increasing a user's satisfaction regarding a printing speed. If a power-saving mode is provided in various steps, power provided to some components may be cut off completely to maximize power-saving effect. In this state, it takes more time to return to a normal mode and thus and a user should wait for a considerable amount of time to perform an image forming job. According to an exemplary embodiment, however, a possibility of an image forming apparatus being used is predicted and the image forming apparatus becomes prepared accordingly and thus, a user's satisfaction becomes maximized.

In the above various exemplary embodiments, a Wi-Fi direct network has been described as the wireless network, but a wireless network connection is not limited thereto. That is, the technical feature of predicting the possibility of using an image forming apparatus and getting an image forming apparatus prepared accordingly may also be applied when the connection is made through other wireless communication standards such as a Bluetooth connection or an ad-hoc connection.

The possibility of using an image forming apparatus may also be predicted in various cases. For example, if an image forming apparatus is positioned on a path and a user passes by the area near the image forming apparatus, there is a possibility that the image forming apparatus would be connected automatically by a pre-stored profile. A terminal device which is not used frequently in comparison with its number of times of connection may be registered in a database in advance. If such a terminal device, having a low possibility of being used, is registered in a list and a terminal device included in the list is connected, a status may not be changed unless a command to do otherwise is input.

In addition, it may be determined that there is a possibility to use a terminal device even when a connection is made for the first time, twice, or three times.

In the above exemplary embodiments, an image forming apparatus operates as a group owner in a wireless communication group according to a Wi-Fi direct standard, but this is only an example. Even if an image forming apparatus operates as a client and connects to another terminal device which is an owner, the image forming apparatus may perform warming-up or change of an operation mode as long as there is a possibility of being used.

The method of operating an image forming apparatus according to the above-mentioned various exemplary embodiments may be stored in various types of recording media to be embodied as a program code executable by a CPU.

Specifically, a program for performing the above-mentioned operating method may be stored in various types of recording media readable by a terminal, such as Random Access Memory (RAM), flash memory, Read Only Memory (ROM), Erasable Programmable ROM (EPROM), Electronically Erasable and Programmable ROM (EEPROM), register, hard disk, removable disk, memory card, USB memory, and CD-ROM.

Although a few embodiments of the present general inventive concept have been shown and described, it would be appreciated by those skilled in the art that changes may be made in this these embodiments without departing from the principles and spirit of the invention, the scope of which is defined in the claims and their equivalents.

What is claimed is:

1. An image forming apparatus, comprising: a connection unit to establish a communication connection with an external device; a condition analysis unit to determine whether a predetermined condition exists corresponding to a high likelihood that the image forming apparatus will receive an image forming request from the external device; and
   a controller to control the image forming apparatus to change from a power-save mode to an image-formation ready mode when it is determined that the predetermined condition exists and based on a comparison of unique information of the external device with pre-stored unique information,
   wherein the predetermined condition includes a case in which a frequency of use exceeds a threshold value,
   wherein the frequency of use is a ratio of a number of times an image forming job is performed based on the request by the external device connected with the image forming apparatus to a number of times the external device is connected with the image forming apparatus.

2. The image forming apparatus of claim 1, wherein the predetermined condition further includes at least one of a first-time connection between the external device and the image forming apparatus and a determination that the communication connection with the external device is a new network.

3. The image forming apparatus of claim 2, wherein when the predetermined condition includes the determination that the external device has requested the image-forming operation of the image forming apparatus with the at least predetermined frequency, the controller further determines a signal strength of the communication connection with the external device, and the controller controls the image forming apparatus to change from the power-save mode to the image-formation ready mode based on each of the predetermined condition and the signal strength of the communication connection with the external device.

4. The image forming apparatus of claim 3, wherein the controller compares a present signal strength of the communication connection with a previous signal strength of the communication connection, and controls the image forming apparatus to change from the power-save mode to the image-formation ready mode when it is determined that the present signal strength has increased by a predetermined degree from the previous signal strength.

5. An image-forming system, comprising:
   an image forming apparatus; and
   an external device to connect to the image forming apparatus to perform an imaging operation with the image forming apparatus,
   wherein the image forming apparatus comprises:
      a connection unit to establish a communication connection with the external device,
      a probability determining unit to determine whether a predetermined condition exists corresponding to a high likelihood that the image forming apparatus will receive an image forming request from the external device, and a controller to control the image forming apparatus to change from a power-save mode to an image-formation ready mode when it is determined that the predetermined condition exists and based on a comparison of unique information of the external device with pre-stored unique information, wherein the predetermined condition includes a case in which frequency of use exceeds a threshold value, wherein the frequency of use is a ratio of a number of times an image forming job is performed based on the request by the external device connected with the image forming apparatus to a number of times the external device is connected with the image forming apparatus.

* * * * *